(12) United States Patent
Nezu

(10) Patent No.: US 11,345,319 B2
(45) Date of Patent: May 31, 2022

(54) DEVICE FOR SPRAYING FLUID ON VEHICLE CAMERA

(71) Applicant: NIFCO INC., Yokosuka (JP)

(72) Inventor: Mikio Nezu, Yokosuka (JP)

(73) Assignee: NIFCO INC., Yokosuka (JP)

( * ) Notice: Subject to any disclaimer, the term of this patent is extended or adjusted under 35 U.S.C. 154(b) by 398 days.

(21) Appl. No.: 16/476,707

(22) PCT Filed: Jan. 5, 2018

(86) PCT No.: PCT/JP2018/000103
§ 371 (c)(1),
(2) Date: Jul. 9, 2019

(87) PCT Pub. No.: WO2018/135322
PCT Pub. Date: Jul. 26, 2018

(65) Prior Publication Data
US 2019/0375378 A1    Dec. 12, 2019

(30) Foreign Application Priority Data

Jan. 20, 2017  (JP) .............................. JP2017-008155
Sep. 22, 2017  (JP) .............................. JP2017-182228

(51) Int. Cl.
*B60S 1/56*    (2006.01)
*B05B 12/08*   (2006.01)
(Continued)

(52) U.S. Cl.
CPC .............. *B60S 1/56* (2013.01); *B05B 12/087* (2013.01); *B08B 5/02* (2013.01); *B60R 11/04* (2013.01)

(58) Field of Classification Search
CPC ......... B05B 3/02; B05B 1/005; B05B 12/087; B60S 1/54; B60S 1/56; B60S 1/62;
(Continued)

(56) References Cited

U.S. PATENT DOCUMENTS 5,151,015 A * 9/1992 Bauer .................... F04B 39/10
417/415
2011/0277877 A1* 11/2011 Stehle ................... B29C 73/166
141/38
(Continued)

FOREIGN PATENT DOCUMENTS

CN    105537171 A    5/2016
JP    S12-005863 Y1  5/1937
(Continued)

OTHER PUBLICATIONS

PCT/ISA/210, "International Search Report for International Application No. PCT/JP2018/000103," dated Mar. 6, 2018.
(Continued)

*Primary Examiner* — Tuongminh N Pham
(74) *Attorney, Agent, or Firm* — Manabu Kanesaka

(57) ABSTRACT

A device for spraying a fluid on a vehicle camera includes a flow passage for connecting a suction portion with a discharge portion; a cylinder for communicating a pressure chamber in front of a piston with the flow passage; a drive mechanism for the piston including a motor; a first valve located between the suction portion and the pressure chamber, and functioning such that the first valve opens when the piston moves backward and closes when the piston moves forward; a second valve located between the pressure chamber and the discharge portion, and functioning such that the second valve opens when a pressure in the pressure chamber reaches a predetermined value by a forward movement of the piston; and a casing for housing the flow passage, the cylinder, the drive mechanism, the first valve, and the second valve to be combined with the vehicle camera.

7 Claims, 13 Drawing Sheets

(51) Int. Cl.
   *B08B 5/02* (2006.01)
   *B60R 11/04* (2006.01)

(58) Field of Classification Search
   CPC ...... B60S 1/0848; B08B 5/02; F04B 39/0016; F04B 35/01
   See application file for complete search history.

(56) References Cited

U.S. PATENT DOCUMENTS

| | | | |
|---|---|---|---|
| 2015/0343999 A1* | 12/2015 | Lopez Galera | B60S 1/481 134/30 |
| 2019/0100171 A1* | 4/2019 | Ina | B08B 3/02 |
| 2020/0171998 A1* | 6/2020 | Kondo | B60Q 1/0017 |

FOREIGN PATENT DOCUMENTS

| | | |
|---|---|---|
| JP | S125863 Y | 5/1937 |
| JP | S40-033115 Y1 | 11/1965 |
| JP | S50-058622 A | 5/1975 |
| JP | S53-072229 A | 6/1978 |
| JP | S53-113951 U | 9/1978 |
| JP | 2001-165339 A | 6/2001 |
| JP | 2005-133744 A | 5/2005 |
| JP | 2012-511655 A | 5/2012 |
| JP | 2015-083830 A | 4/2015 |
| JP | 2015-224032 A | 12/2015 |
| JP | 2016-530438 A | 9/2016 |
| JP | 2017-101653 A | 6/2017 |

OTHER PUBLICATIONS

China National Intellectual Property Administration, "Office Action for Chinese Patent Application 201880007654.3," dated Feb. 7, 2022.

China National Intellectual Property Administration, Search Report for Chinese Patent Application 201880007654.3, dated Jan. 25, 2022.

* cited by examiner

DEVICE FOR SPRAYING FLUID ON VEHICLE CAMERA

FIELD OF TECHNOLOGY

The present invention relates to a device for spraying a fluid.

BACKGROUND ART

As a device for cleaning a lens by spraying a compressed air on the lens of a car-mounted camera, there is a device shown in Patent Document 1, wherein the cleaning device of the Patent Document 1 has a structure such that relative to a nozzle unit to be combined with the car-mounted camera, an air pump which is a separate member from the nozzle unit is connected by a hose. Namely, in the cleaning device of the Patent Document 1, when the cleaning device is attached to a vehicle, a space is required for disposing the air pump in addition to a space for disposing the nozzle unit.

PRIOR ART DOCUMENT

Patent Document

Patent Document 1: Japanese Patent Application Publication No. 2015-83830

SUMMARY OF THE INVENTION

Problems to be Solved by the Invention

An object of the present invention is that in this type of device for spraying the fluid (cleaning device), as a unit having all functions for spraying the fluid on a light entrance portion of a vehicle camera, only by combining with the vehicle camera, a function of removing water droplets, dust, or the like attached to the light entrance portion can be easily and reliably added relative to the vehicle camera or the vehicle comprising the vehicle camera.

Means for Solving the Problems

In order to obtain the aforementioned object, in the present invention, a device for spraying a fluid on a vehicle camera comprises a suction portion for a fluid; a discharge portion for the fluid; a flow passage for connecting the suction portion with the discharge portion; a cylinder for communicating a pressure chamber in front of a piston with the flow passage; a drive mechanism for the piston including a motor; a first valve located between the suction portion and a communication portion between the pressure chamber and the flow passage, and functioning such that the first valve opens when the piston moves backward, and closes when the piston moves forward; a second valve located between the communication portion between the pressure chamber and the flow passage and the discharge portion, and functioning such that the second valve opens when a pressure in the pressure chamber reaches a predetermined value by a forward movement of the piston; and a casing for housing the above to be combined with the vehicle camera so that the fluid discharged from the discharge portion is sprayed on a light entrance portion of the vehicle camera.

One of the aspects of the present invention is that the drive mechanism for the piston comprises an urging device for urging the piston in a backward-movement direction; and a rotation member including a cam portion against which a back end portion of the piston abuts by an urging force, and rotation-driven by the motor, wherein when the rotation member rotates, the piston moves forth and back by a shape of the cam portion.

Also, one of the aspects of the present invention is that on a side portion of the piston, there is formed a circumferential groove, and a seal ring is mounted using the circumferential groove. Also, one of the aspects of the present invention is that there is formed a communication path between a front end portion facing the pressure chamber of the piston, and a portion positioned inside the seal ring in the circumferential groove.

Also, one of the aspects of the present invention is that the piston comprises the front end portion facing the pressure chamber; a neck portion positioned behind the front end portion; and a trunk portion positioned behind the neck portion. Also, one of the aspects of the present invention is that in the piston, there is mounted the seal ring using the neck portion, and the communication path is formed between the front end portion and the portion positioned inside the seal ring.

Also, one of the aspects of the present invention is that an inclined face is formed in the front end portion of the piston, and an entrance of the communication path is formed on the inclined face.

Also, one of the aspects of the present invention is that the second valve comprises a body portion including a large diameter chamber positioned in the discharge-portion side and a small diameter chamber positioned in the pressure-chamber side, and having a communication portion with the small diameter chamber inside the large diameter chamber as a valve seat; a valve member positioning a valve head portion inside the large diameter chamber, and inserting a shaft portion extending from the valve head portion into the small diameter chamber; and a holding device holding the valve member in a closing valve position wherein the valve head portion is closely attached to the valve seat until the pressure inside the pressure chamber reaches the predetermined value by the forward movement of the piston. Also, one of the aspects of the present invention is that an outer diameter of the shaft portion of the valve member and a diameter of the small diameter chamber are substantially equal, and one line of groove along a length direction of the shaft portion is formed at a side portion of the shaft portion.

Also, one of the aspects of the present invention is that the holding device comprises one of a magnet and a ferromagnetic material, to which the magnet is adsorbed, on the valve-member side, and the other of the magnet and the ferromagnetic material on the body-portion side.

Also, one of the aspects of the present invention is that the fluid is air.

Effect of the Invention

According to the present invention, in the device for spraying the fluid, as a unit having all functions for spraying the fluid on the light entrance portion of the vehicle camera, only by combining with the vehicle camera, a function of removing water droplets, dust, or the like attached to the light entrance portion can be easily and reliably added relative to the vehicle camera or the vehicle comprising the vehicle camera.

BEST MODES OF CARRYING OUT THE INVENTION

Hereinafter, with reference to FIG. 1 to FIG. 19, typical embodiments of the present invention will be explained. A fluid spraying device A according to the present embodiment is combined relative to a vehicle camera C provided in a vehicle of a passenger car and the like so as to spray a fluid on a light entrance portion 1 of the vehicle camera C for removing water droplets, dust, or the like attached to the light entrance portion 1 by such fluid.

Typically, such fluid spraying device A is combined with the vehicle camera C with the light entrance portion 1 outside a vehicle interior of an automobile to be used.

In an illustrated example, such fluid spraying device A has a structure suitable for combining with the vehicle camera C forming an electron mirror for monitoring a back side of the automobile in place of a conventional door mirror and the like.

Figure 1:
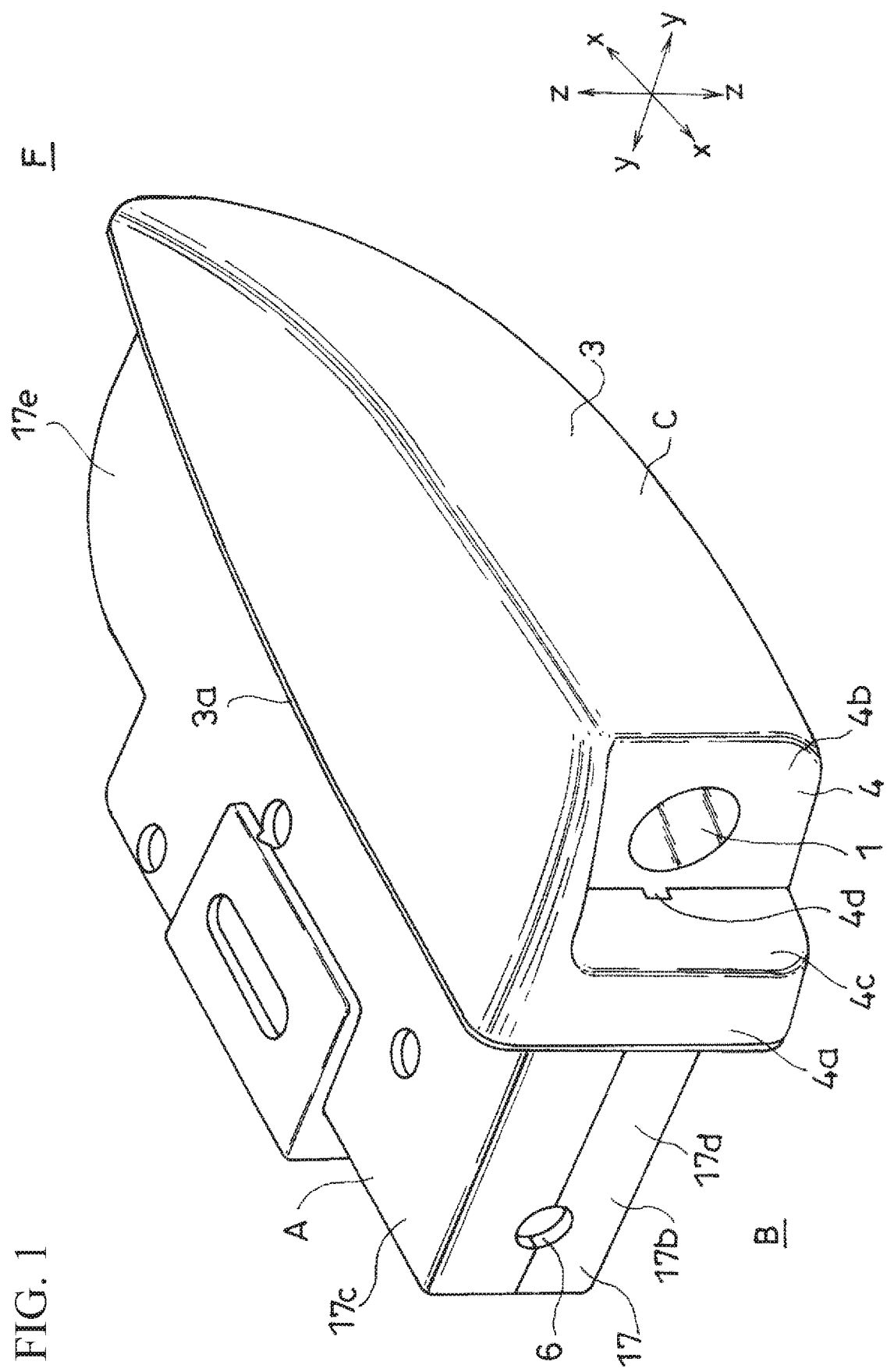
FIG. 1 is a perspective structural view showing a condition when a device for spraying a fluid is combined with a vehicle camera according to one embodiment of the present invention.
Figure 3:
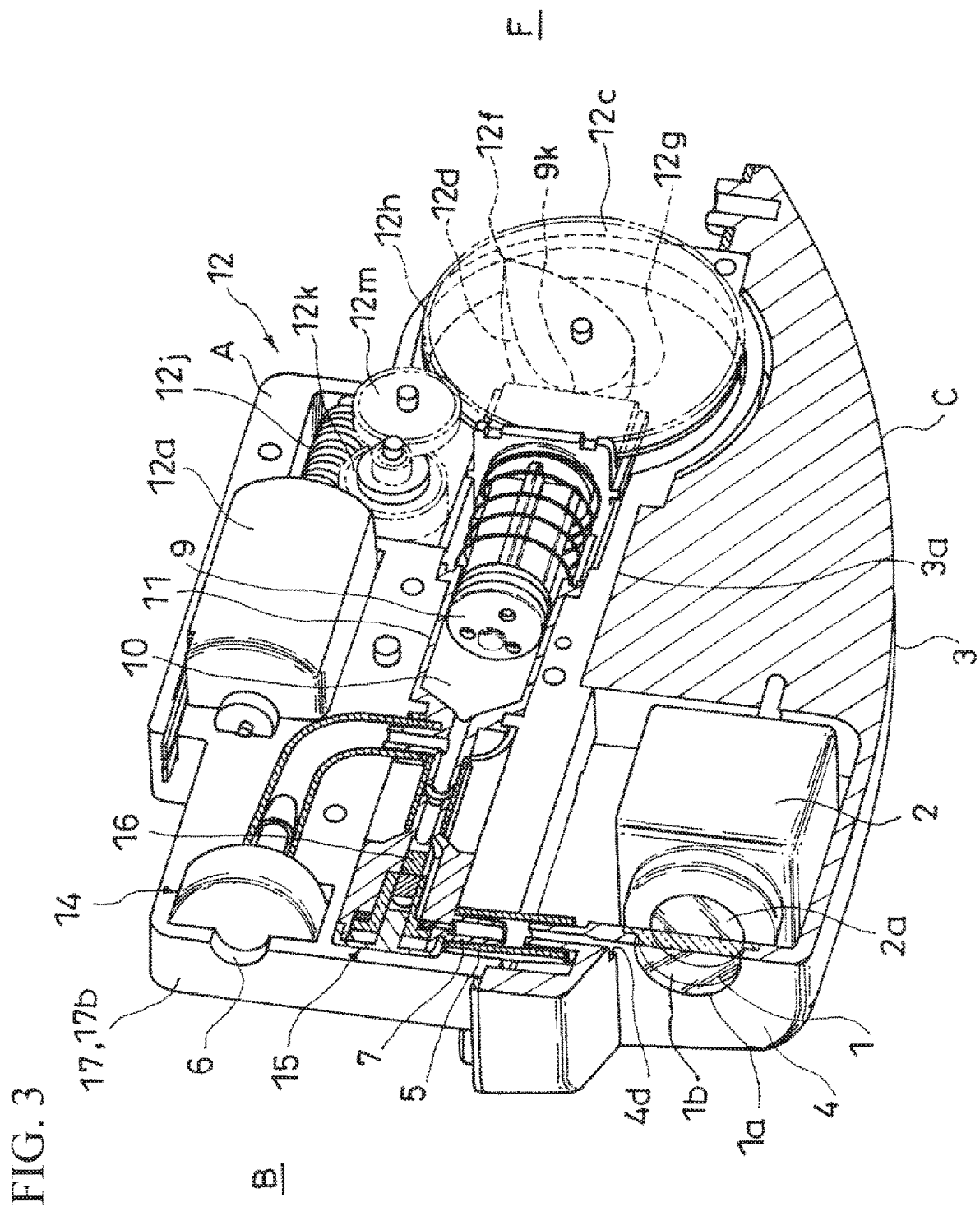
FIG. 3 is a partially cut perspective structural view of essential parts in the condition in FIG. 1, wherein a piston is located in a maximum backward-movement position.

In FIG. 1, the reference C represents the vehicle camera, and the reference A represents the fluid spraying device. In the illustrated example, the vehicle camera C has a structure wherein a camera main member represented by the reference numeral 2 in FIG. 3 is incorporated inside a casing represented by the reference numeral 3 (incidentally, in each drawing, incorporated components except for the camera main member 2 in the vehicle camera C are omitted in the drawings). The vehicle camera C is long in a front-and-back direction x, has a thickness of an up-and-down direction z, gradually increases a width in a right-and-left direction y as moving toward a back side B, and comprises the circular light entrance portion 1 on a back end face 4. The light entrance portion 1 is positioned behind a lens portion 2a of the camera main member 2, and has a structure wherein a circular hole 1a is closed by a shield 1b which allows a light to pass through (see FIG. 3). The back end face 4 includes a first face 4a positioned on a vehicle-interior side, and a second face 4b positioned outside the first face 4a and in front of the first face 4a, and the light entrance portion 1 is formed in the second face 4b. A step face 4c is formed between the first face 4a and the second face 4b. In a portion wherein the step face 4c and the second face 4b contact with each other, there is formed a blowing-out hole 4d connected to a discharge portion 7 of the fluid spraying device A through a tube 5, and the fluid discharged from the discharge portion 7 of the fluid spraying device A is sprayed on the light entrance portion 1 through the blowing-out hole 4d (see FIG. 3). In a case that there is no shield 1b as shown in the drawings, and the lens portion 2a of the camera main member 2 forming the vehicle camera 2 is exposed at an outside of the casing 3, the light entrance portion 1 becomes the lens portion 2a itself.

As shown in FIG. 1 to FIG. 4, the fluid spraying device A comprises:

(1) a suction portion 6 for the fluid;

(2) a discharge portion 7 for the fluid;

(3) a flow passage 8 for connecting the suction portion 6 with the discharge portion 7;

(4) a cylinder 11 for communicating a pressure chamber 10 (a space inside the cylinder 11 to change a volume by a movement of a piston 9) in front of the piston 9 with the flow passage 8;

(5) a drive mechanism 12 for the piston 9 including a motor 12a;

(6) a first valve 14 located between the suction portion 6 and a communication portion 13 between the pressure chamber 10 and the flow passage 8, and functioning such that the first valve 14 opens when the piston 9 moves backward to open the flow passage 8, and the first valve 14 closes when the piston 9 moves forward to close the flow passage 8;

(7) a second valve 15 located between the communication portion 13 between the pressure chamber 10 and the flow passage 8, and the discharge portion 7, and functioning such that the second valve 15 opens when a pressure in the pressure chamber 10 reaches a predetermined value by a forward movement of the piston 9 to open the flow passage 8; and (8) a casing 17 for housing the above to be combined with the vehicle camera so that the fluid discharged from the discharge portion 7 is sprayed on the light entrance portion 1 of the vehicle camera C.

The illustrated example has a structure for sucking an air as the fluid from the suction portion 6 and spraying on the light entrance portion 1 from the discharge portion 7. The fluid can be a cleaning liquid, and can be a fluid in which the cleaning liquid is mixed with the air as well.

In the illustrated example, the fluid spraying device A is formed by incorporating the aforementioned elements (1) to (7) into the flat casing 17 which is long in the front-and-back direction x, is short in the right-and-left direction y, and has the thickness of the up-and-down direction z.

Figure 2:
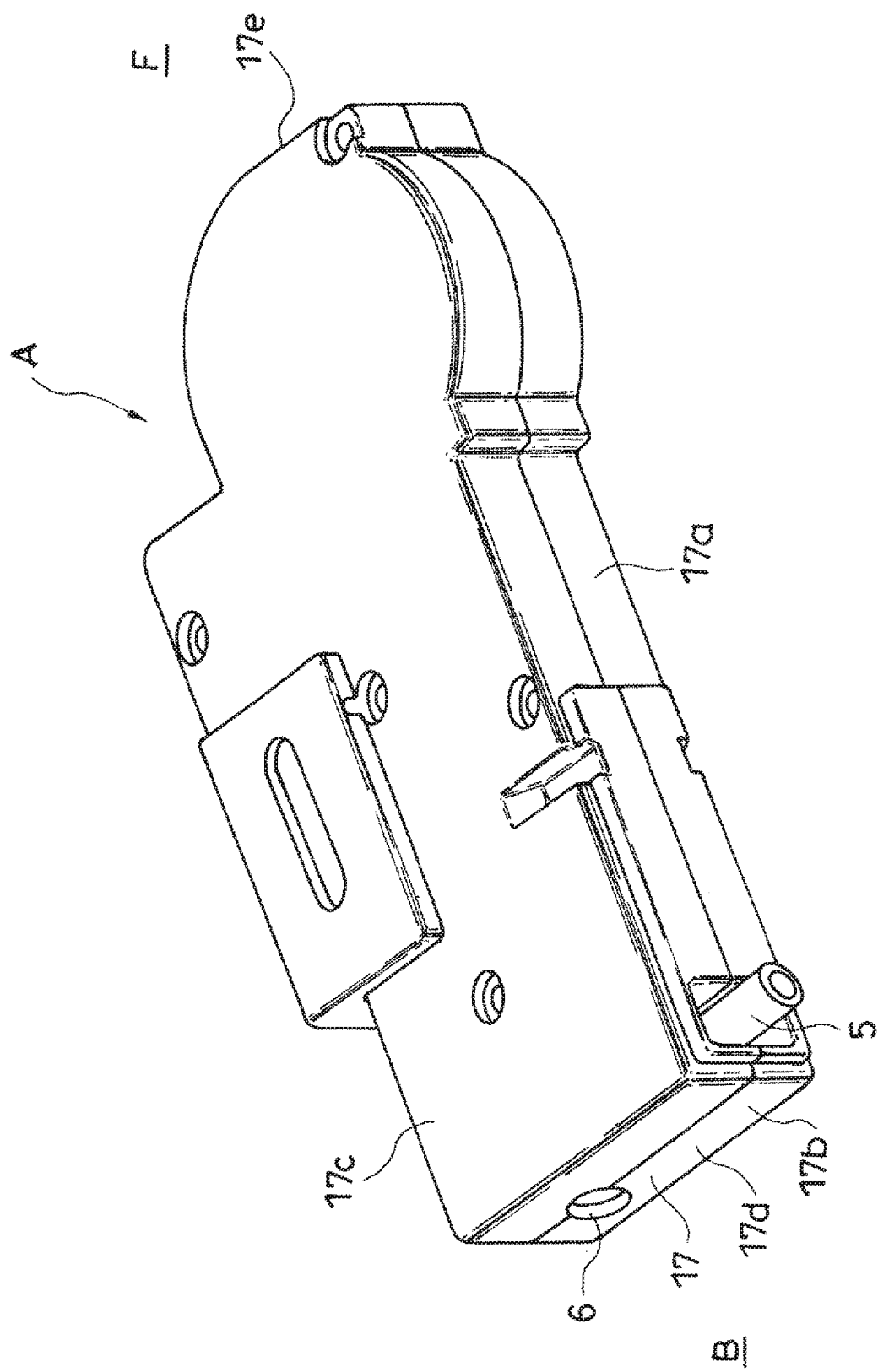
FIG. 2 is a perspective structural view of the device for spraying the fluid.

In the illustrated example, the fluid spraying device A is combined with the vehicle camera C such that one thickness-side side face 17a located along a length direction of the casing 17 thereof comes into contact with a side face 3a positioned on the vehicle-interior side in the casing of the vehicle camera C (see FIG. 2 and FIG. 3).

Also, in the illustrated example, the casing 17 of the fluid spraying device A is formed by combining a lower portion 17b with an upper portion 17c, which are separable approximately at a middle position in a thickness direction thereof.

The piston 9 moves along the front-and-back direction x.

Figure 4:
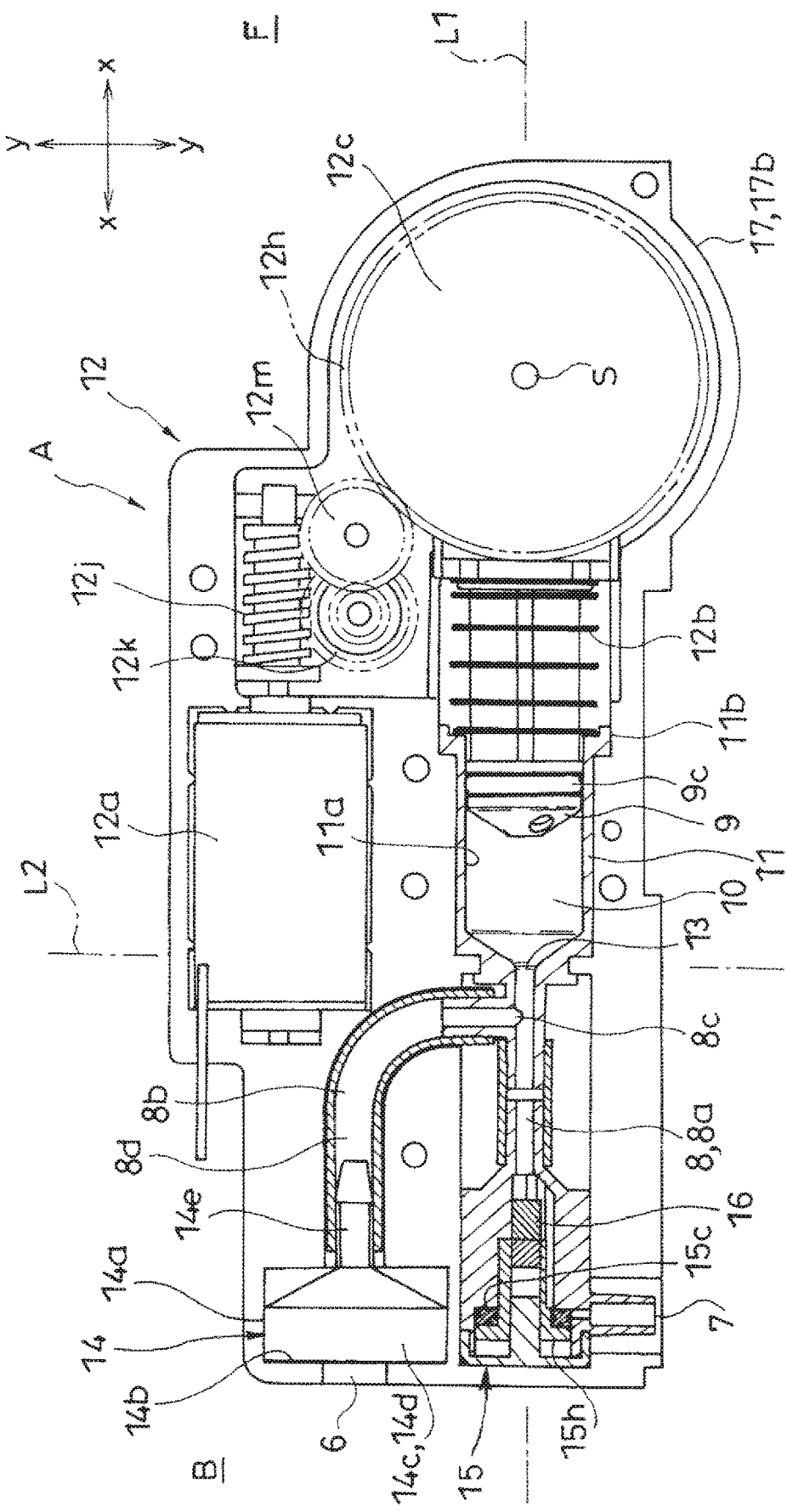
FIG. 4 is a partially cut inner structural view of essential parts of the device for spraying the fluid in the condition in FIG. 3.

As shown in FIG. 4, the suction portion 6 is provided on a side opposite to a side where the vehicle camera C is combined by sandwiching a virtual center line L1 including a center shaft of the piston 9, and in an area which becomes the back side B more than a virtual straight line L2 orthogonal to the center line L1 and passing the communication portion 13 between the pressure chamber 10 and the flow passage 8.

The discharge portion 7 is provided on the side where the vehicle camera C is combined by sandwiching the center line L1, and in the area which becomes the back side B more than the straight line L2.

The flow passage 8 includes a center flow passage 8a along the center line L1. A cross-sectional area of the center flow passage 8a is smaller than a cross-sectional area of the pressure chamber 10, and the center flow passage 8a communicates with the pressure chamber 10 at a front end thereof. Namely, the front end of the center flow passage 8a becomes the communication portion 13 between the pressure chamber 10 and the flow passage 8.

The suction portion 6 is formed in a back end face 17d of the casing 17 (see FIG. 1). The suction portion 6 and the center flow passage 8a communicate by a first lateral flow passage 8b (see FIG. 4). In the first lateral flow passage 8b, a back end thereof becomes the suction portion 6, and a front end 8c thereof communicates with the center flow passage 8a in a position located slightly on the back side B more than the front end (communication portion 13) of the center flow passage 8a (see FIG. 4).

The first valve 14 is formed inside the first lateral flow passage 8b. A body portion 14a forming the first valve 14 is an enlarged-diameter chamber which becomes one portion of the first lateral flow passage 8b, and a valve member 14c forming the first valve 14 is housed inside the body portion 14a to be movable forth and back. A through hole formed between a back inner wall 14b in the body portion 14a and the back end face 17d of the casing 17 functions as the suction portion 6, and the back inner wall 14b in the body portion 14a functions as a valve seat. The valve member 14c includes a head portion 14d having a disk shape, and a leg portion 14e protruding forward from a center on a front side of the head portion 14. In a state wherein the head portion 14d having a diameter larger than that of the through hole as the suction portion 6 is positioned inside the body portion 14a, and the leg portion 14e is inserted into a small diameter portion 8d of the first lateral flow passage 8b located between the body portion 14a and the front end 8c of the first lateral flow passage 8b, the valve member 14c is positioned inside the first lateral flow passage 8b. In case the piston 9 moves backward, in the illustrated example, when the piston 9 moves to a front side F so as to enlarge the volume of the pressure chamber 10, by a pressure change in the pressure chamber 10, the valve member 14c forming the first valve 14 moves to the front side F, and separates from the back inner wall 14b as the valve seat of the body portion 14a so as to open the suction portion 6, so that an external air is sucked into the pressure chamber 10 through the first lateral flow passage 8b and the center flow passage 8a. On the other hand, In case the piston 9 moves forward, in the illustrated example, when the piston 9 moves to the back side B so as to reduce the volume of the pressure chamber 10, by the pressure change in the pressure chamber 10, the valve member 14c forming the first valve 14 moves to the back side B, and is closely attached to the back inner wall 14b as the valve seat of the body portion 14a so as to close the suction portion 6. Namely, the first valve 14 is a one-way valve.

The cylinder 11 is provided in an area which becomes the front side F more than the straight line L2.

Figure 7:
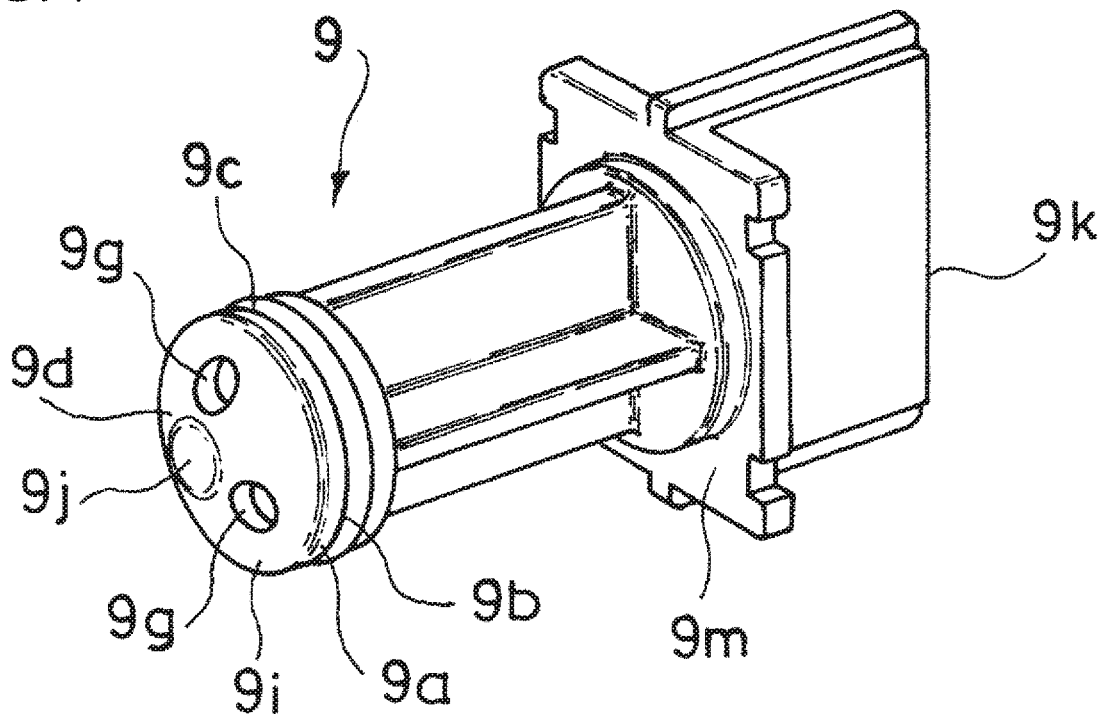
FIG. 7 is a perspective structural view of the piston forming the device for spraying the fluid.
Figure 8:
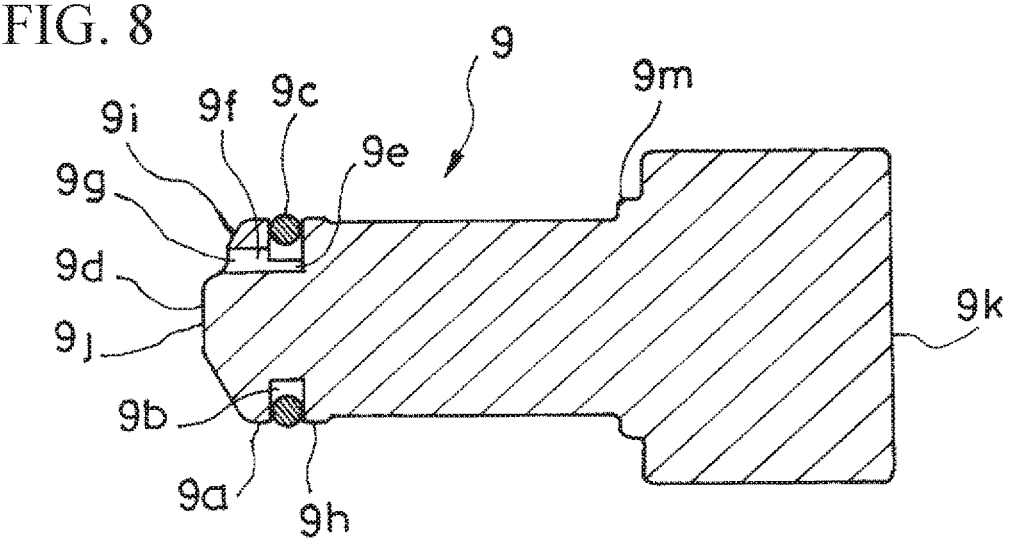
FIG. 8 is a cross-sectional structural view of the piston.
Figure 9:
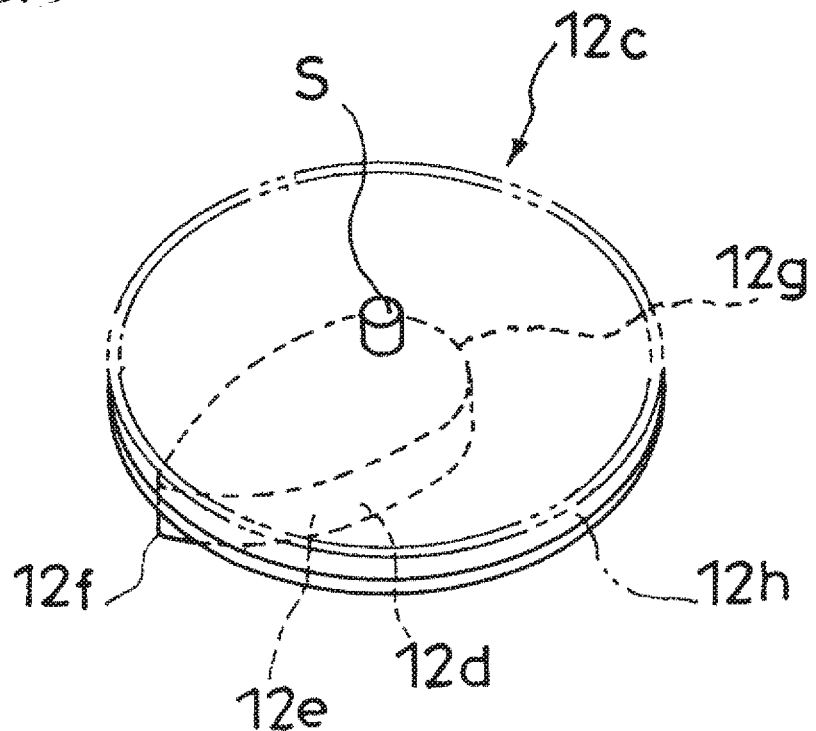
FIG. 9 is a perspective structural view of a rotation member forming a drive mechanism for the piston.
Figure 10:
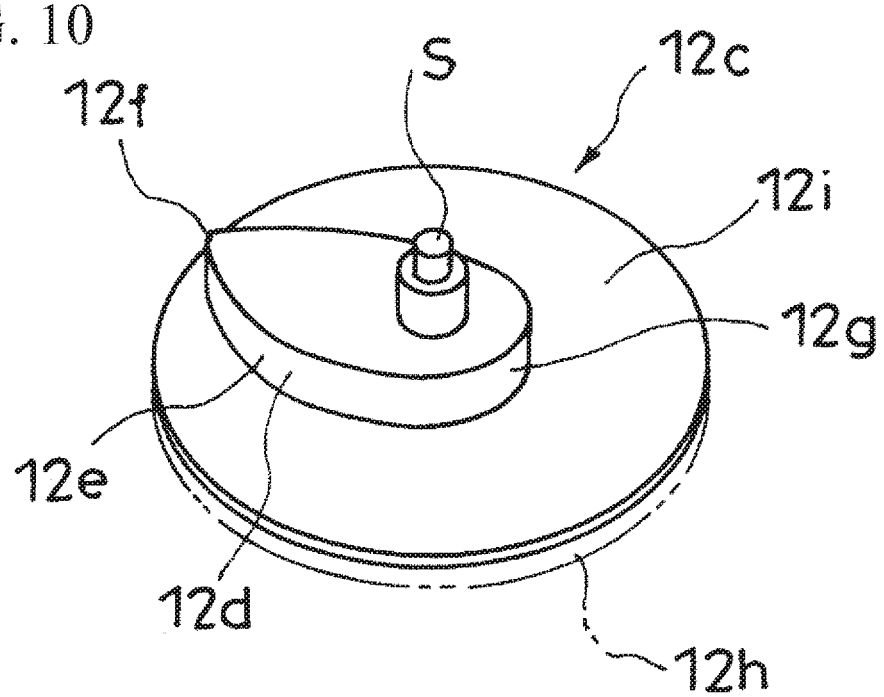
FIG. 10 is a perspective structural view of the rotation member, and shows the rotation member viewed from a lower face side.

On the other hand, in a side portion 9a of the piston 9, there is formed a circumferential groove 9b surrounding the center shaft x, and there is mounted a seal ring 9c to seal between the piston 9 and the cylinder 11 using the circumferential groove 9b (see FIG. 7 and FIG. 8).

Therewith, there are formed communication paths 9f (ventilation paths) between a front end portion 9d facing the pressure chamber 10 of the piston 9 and a portion 9e positioned inside the seal ring 9c in the circumferential groove 9b (see FIG. 8).

In the illustrated example, the piston 9 is formed by a short column-shaped portion 9h having a diameter slightly smaller than an inner diameter of the cylinder 11 on a front-end-portion 9d side thereof. The circumferential groove 9b is formed in a side portion of the short column-shaped portion 9h. An outer diameter of the seal ring 9c is substantially equal to the inner diameter of the cylinder 11, and an inner diameter of the seal ring 9c is slightly smaller than an outer diameter of the short column-shaped portion 9h.

Three communication paths 9f are provided at equal intervals between adjacent communication paths 9f in a direction surrounding the center shaft of the piston 9. All of the respective communication paths 9f are through holes continuing in such a way so as to be in parallel with the center line L1.

When the piston 9 moves forward (moves forth), a pressure inside the circumferential groove 9b on an inner side of the seal ring 9c is increased as well in a manner similar to the pressure chamber 10 by the communication paths 9f, so that the seal ring 9c is elastically deformed in a direction of enlarging the outer diameter so as to enhance a sealing property between the piston 9 and an inner wall 11a of the cylinder 11.

On the other hand, when the piston 9 moves backward (moves back), the pressure inside the circumferential groove 9b on the inner side of the seal ring 9c is reduced as well in a manner similar to the pressure chamber 10 by the communication paths 9f, so that the seal ring 9c is elastically returned in a direction of reducing the outer diameter, and when the piston 9 moves backward, there is no resistance generated between the seal ring 9c and the inner wall 11a of the cylinder 11 as little as possible. Thereby, an excessive force is not required for a backward movement of the piston 9.

Also, in the present embodiment, in the front end portion 9d of the piston 9, there is formed an inclined face 9i, and in the inclined face 9i, there are formed entrances 9g of the communication paths 9f. In the illustrated example, the front end portion 9d includes a top face 9j orthogonal to the center shaft of the piston 9 at a center, and the inclined face 9i having a circumference shape in which a side of the top face 9j is located as an inclination top is located between the top face 9j and the side portion 9a of the piston 9. Thereby, an area of each entrance 9g of the communication path 9f is made larger than a cross-sectional area of the other portions, so that when the piston 9 moves forward, the communication path 9f can effectively take in the air.

Figure 5:
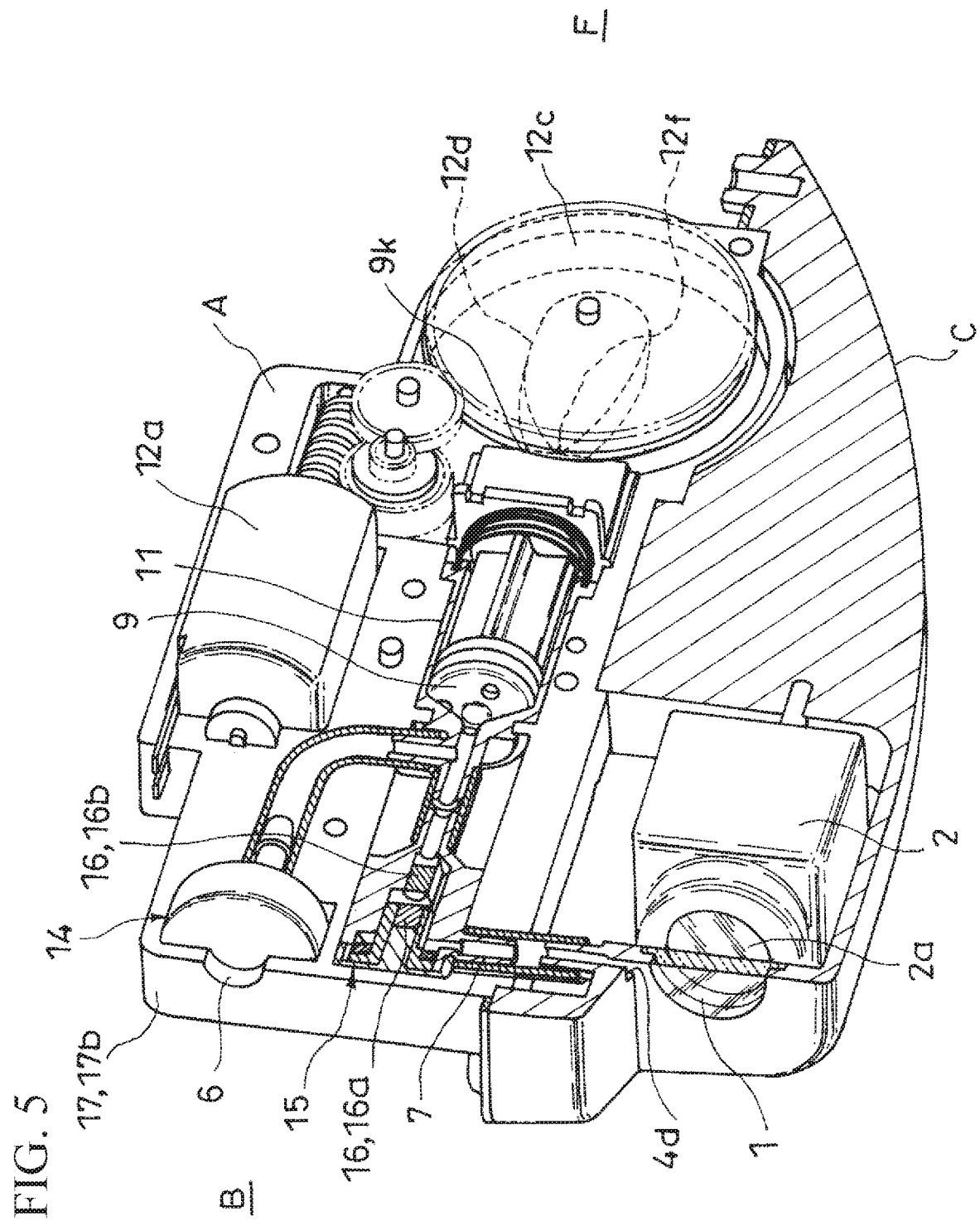
FIG. 5 is a partially cut perspective structural view of essential parts of the condition in FIG. 1, wherein the piston is located in a maximum forward-movement position.
Figure 6:
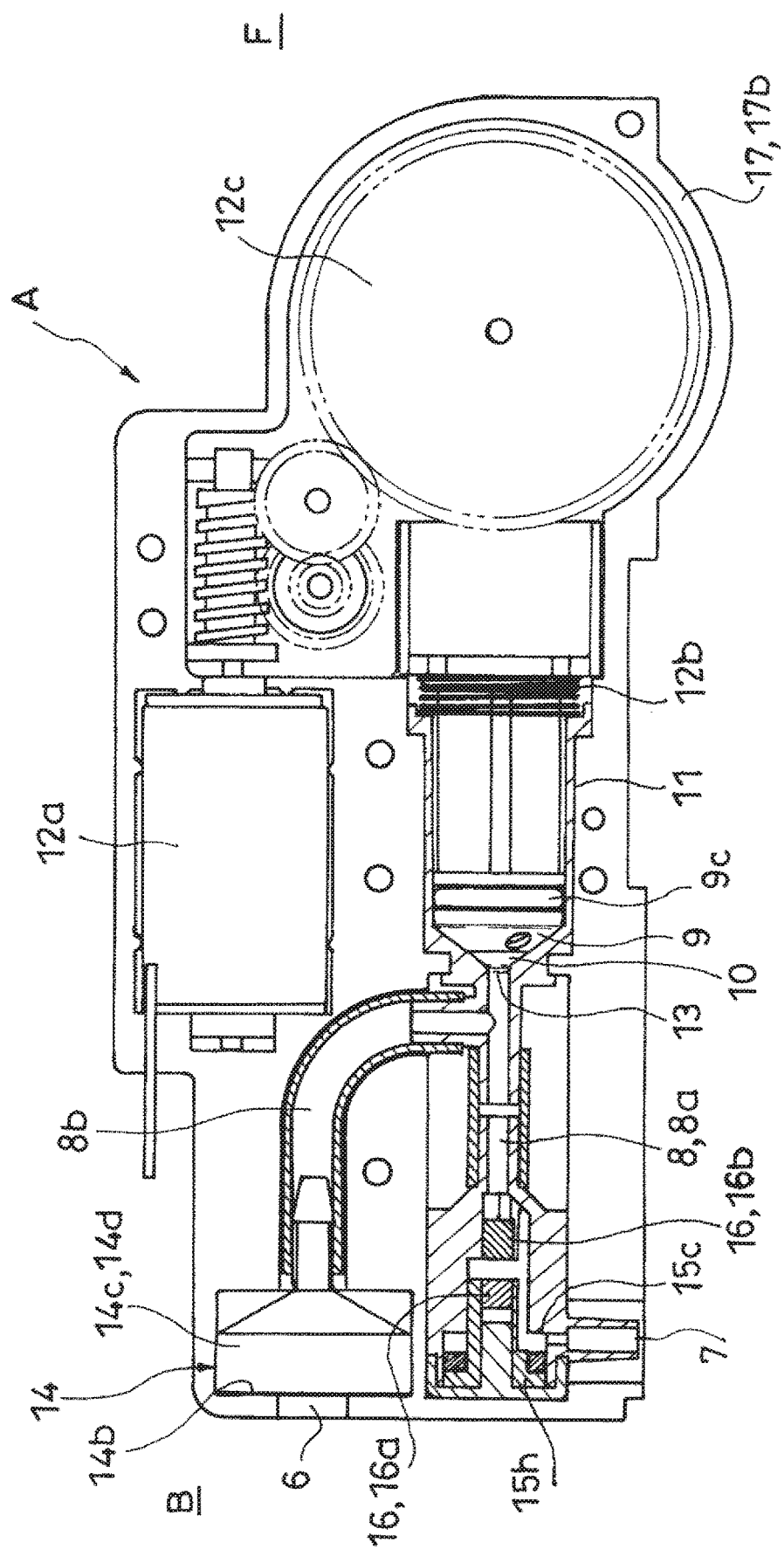
FIG. 6 is a partially cut inner structural view of essential parts of the device for spraying the fluid in the condition in FIG. 5.

The drive mechanism 12 for the piston 9 comprises an urging device 12b urging the piston 9 in a backward-movement direction; and a rotation member 12c comprising a cam portion 12d against which a back end portion 9k of the piston 9 abuts by the urging force to be rotation-driven by the motor 12a (see FIG. 4 and FIG. 5). Then, when the rotation member 12c rotates, the piston 9 is set so as to move forth and back by a shape of the cam portion 12d.

In the illustrated example, the motor 12a forming the drive mechanism 12 is disposed in such a way so as to line up with the piston 9 on the side opposite to the side where the vehicle camera C is combined by sandwiching the center line L1 (see FIG. 4).

The rotation member 12c is disposed such that a rotation shaft S thereof is located along the up-and-down direction z on the center line L1 between the back end portion 9k protruding to the front side F from the cylinder 11 in the piston 9 and a front end face 17e of the casing 17 (see FIG. 2 to FIG. 4).

In the illustrated example, by engaging a gear 12k engaging a worm 12j integrated with an output shaft of the motor 12a with a gear 12m engaging a gear portion 12h formed on an outer periphery of the rotation member 12c, the rotation member 12c rotates by driving the motor 12a (see FIG. 3 and FIG. 4)

On one face of the rotation member 12c, in the illustrated example, on a lower face 12i, there is formed the cam portion 12d. The cam portion 12d has a structure of protruding from the lower face 12i of the rotation member 12c, and there is formed a cam face 12e as a circumferential step face between the cam portion 12d and the lower face 12i of the rotation member 12c. The cam face 12e includes a first portion 12f having a maximum distance from the rotation shaft S of the rotation member 12c; and a second portion 12g positioned on a side opposite to the first portion 12f by sandwiching the rotation shaft of the rotation member 12c.

In the illustrated example, the urging device 12b is a compression coil spring (see FIG. 3 and FIG. 4). Obviously, it is sufficient that such urging device 12b can urge the piston 9 in the backward-movement direction, and various types of springs in addition to the compression coil spring, or an elastic member providing a repulsive force in a fashion similar to the springs, may be used. One end of the spring is pressed against a step 11b formed in a portion surrounding an opening opposite to a pressure-chamber 10 side of the cylinder 11, and the other end of the spring is pressed against a flange portion 9m formed between the front end portion 9d and the back end portion 9k of the piston 9 (see FIG. 4, FIG. 7, and FIG. 8).

In the illustrated example, the back end portion 9k of the piston 9 has a plate shape having the thickness of the up-and-down direction z, and enters beneath the lower face 12i of the rotation member 12c so as to always press against the cam face 12e of the cam portion 12d by the urging force of the urging device 12b (see FIG. 5 and FIG. 7).

When the rotation member 12c is located in a rotation position wherein the second portion 12g of the cam face 12e presses against the back end portion 9k of the piston 9, the piston 9 comes to a position wherein the piston 9 is moved backward most by the urging force of the compression coil spring. On the other hand, when the rotation member 12c is located in a rotation position wherein the first portion 12f of the cam face 12e presses against the back end portion 9k of the piston 9, the piston 9 comes to a position wherein the piston 9 is moved forward most, so that the compression coil spring comes to a most compressed state.

The forward movement of the piston 9 is carried out by an operation of the cam portion 12d by a rotation of the rotation member 12c, and the backward movement of the piston 9 is carried out by an operation of the urging device 12b accompanied by the rotation of the rotation member 12c. When the piston 9 reciprocates, comparing with a case using a crank shaft, there are no top and bottom dead centers, and even when the rotation member 12c is located at any rotation position, at the same time when the motor 12a is driven, the piston 9 can be smoothly operated. Also, since the excessive force for the backward movement of the piston 9 is not required by the communication paths 9f of the piston 9, the urging force of the urging device 12b can be minimized. Therefore, a load of the motor 12a when the piston 9 moves forward can be minimized as well.

Also, the second valve 15 is formed inside the center flow passage 8a (see FIG. 4 and FIG. 5).

Figure 11:
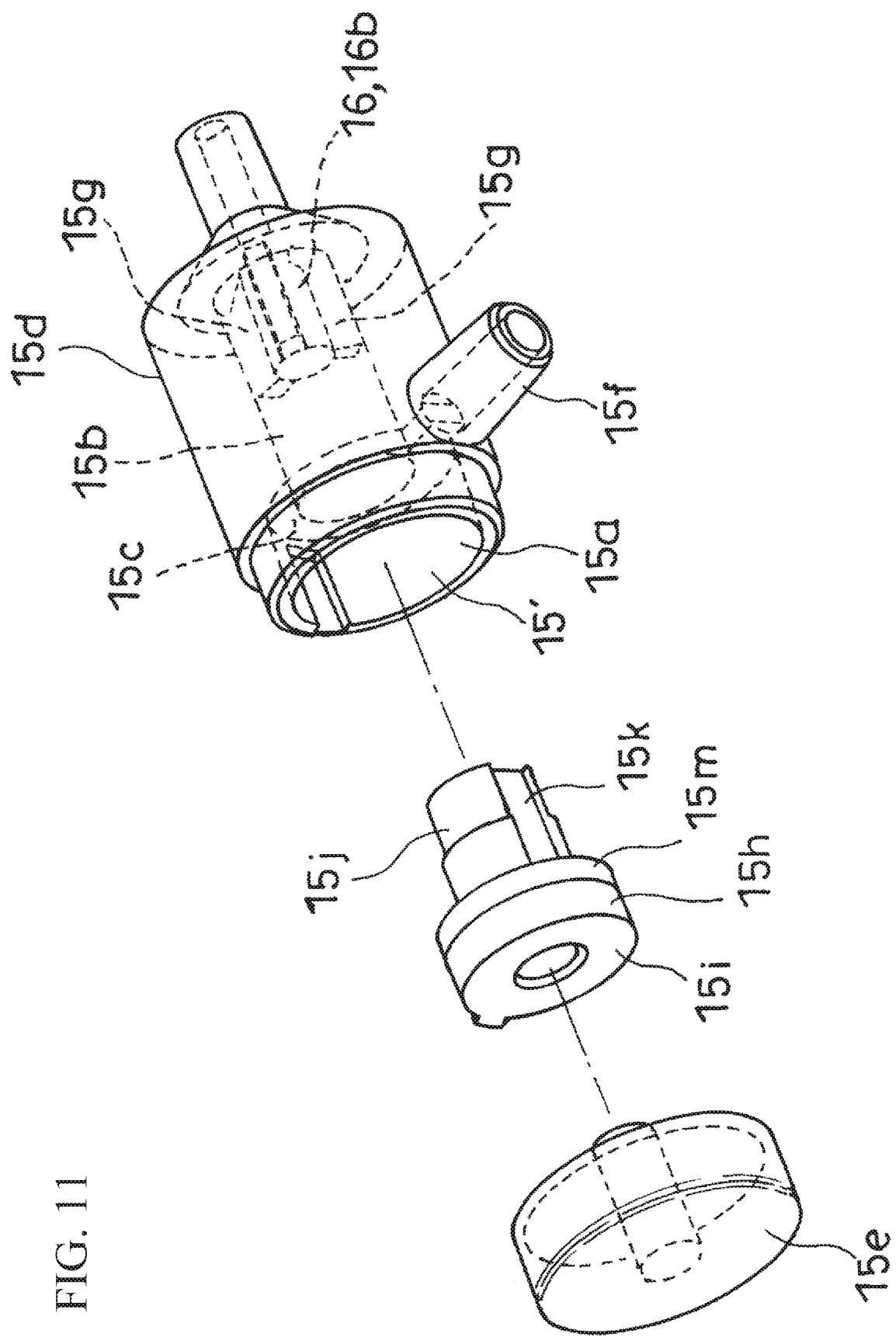
FIG. 11 is an exploded perspective structural view of a second valve forming the device for spraying the fluid.
Figure 12:
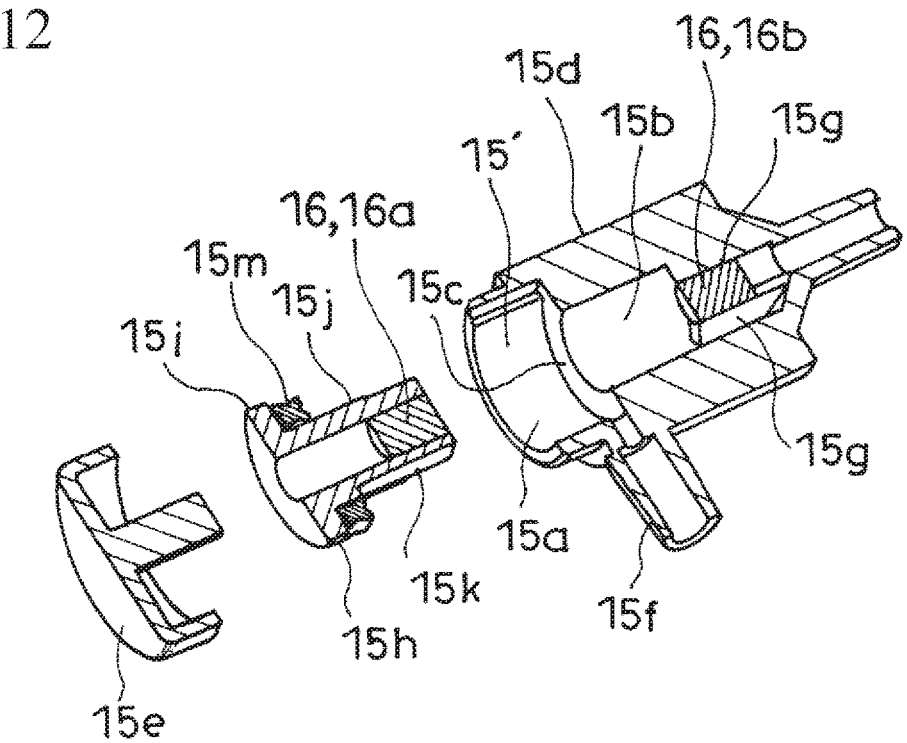
FIG. 12 is a partially cut exploded perspective structural view of essential parts of the second valve.
Figure 13:
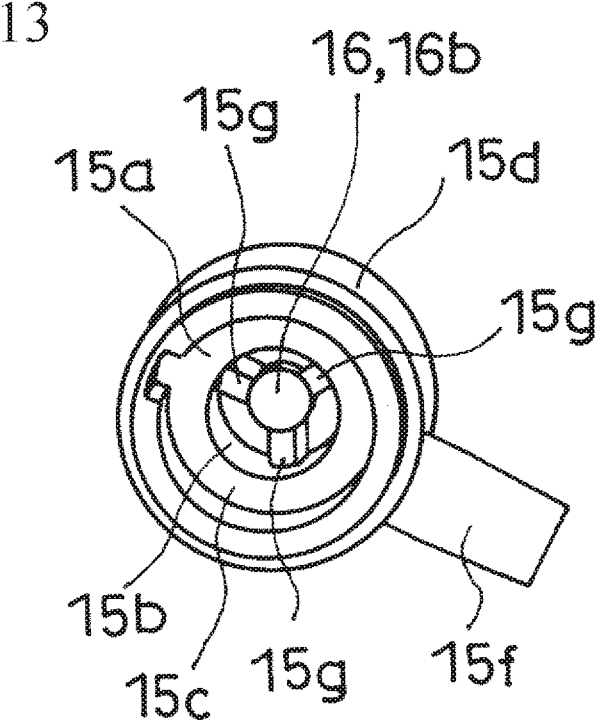
FIG. 13 is a perspective structural view of a main member portion forming the second valve.

As shown in FIG. 11 and FIG. 12, the second valve 15 comprises a body portion 15' including a large diameter chamber 15a positioned on the discharge-portion 7 side and a small diameter chamber 15b positioned on the pressure-chamber 10 side, wherein a communication portion with the small diameter chamber 15b inside the large diameter chamber 15a is a valve seat 15c; a valve member 15h positioning a valve head portion 15i inside the large diameter chamber 15a, and inserting a shaft portion 15j extending from the valve head portion 15i into the small diameter chamber 15b; and a holding device 16 holding the valve member 15h in a closing valve position wherein the valve head portion 15i is closely attached to the valve seat 15c until the pressure in the pressure chamber 10 reaches the predetermined value by the forward movement of the piston 9.

Also, an outer diameter of the shaft portion 15j of the valve member 15h and a diameter of the small diameter chamber 15b are substantially equal, and one line of groove 15k (ventilation groove) is formed across a whole length thereof along a length direction of the shaft portion 15j at a side portion of the shaft portion 15j.

As shown in FIG. 11 and FIG. 12, in the illustrated example, the body portion 15' is formed by combining a main member portion 15d with a cap 15e. The main member portion 15d includes the small diameter chamber 15b formed along the center line L1 at the front side F, and the large diameter chamber 15a at the back side B thereof. Also, at a side portion of the large diameter chamber 15a, there is communicated a tube portion 15f extending in a direction orthogonal to the center line L1, and a tip of the tube portion 15f functions as the discharge portion 7. The valve seat 15c becomes a step face inside the main member portion 15d, which is formed by a size difference between the large diameter chamber 15a and the small diameter chamber 15b, and surrounds an opening facing the large diameter chamber 15a for communicating the large diameter chamber 15a and the small diameter chamber 15b. After the valve member 15h is housed inside the main member portion 15d in such a way so as to form the large diameter chamber 15a between the valve member 15h and the valve seat 15c, the cap 15e is combined with the main member portion 15d.

The valve member 15h includes a valve head portion 15i having a disk shape, and a shaft portion 15j having a cylinder shape protruding to the front side F from a center on one face side of the valve head portion 15i. An outer diameter of the valve head portion 15i has a size which can be housed in the large diameter chamber 15a, and cannot be housed in the small diameter chamber 15b. In a state wherein the valve head portion 15i is positioned inside the large diameter chamber 15a, and the shaft portion 15j is inserted into the small diameter chamber 15b, the valve member 15h is held inside the body portion 15' to be movable forth and back. Also, in the illustrated example, in a base portion of the shaft portion 15j, there is fitted a seal ring 15m forming one portion of the valve head portion 15i, and the seal ring 15m contacts the valve seat 15c.

In the present embodiment, until the pressure in the pressure chamber 10 reaches the predetermined value by the forward movement of the piston 9, the valve member 15h is held by the holding device 16 in the closing valve position wherein the valve head portion 15i is closely attached to the valve seat 15c.

When the pressure in the pressure chamber 10 reaches the predetermined value, the holding by the holding device 16 is released, the valve member 15h moves to an opening valve position, in the illustrated example, to the back side B, and a compressed air is blown out through the discharge portion 7. In such opening valve state, an air-passing portion of the small diameter chamber 15b of the body portion 15' is substantially limited to one line of groove 15k formed in the shaft portion of the valve member 15h so as to effectively enhance a flow speed of the air blowing out.

In the present embodiment, the holding device 16 comprises one of a magnet and a ferromagnetic material, to which the magnet is adsorbed, on the valve-member 15h side, and the other of the magnet and the ferromagnetic material on the body-portion 15' side.

In the illustrated example, a first columnar member 16a fits into the shaft portion 15j of the valve member 15h such that an end face of the first columnar member 16a becomes the same face with a tip of the shaft portion 15j.

Also, inside the small diameter chamber 15b of the body portion 15', there is fitted a second columnar member 16b. In the illustrated example, inside the small diameter chamber 15b, there are formed three ribs 15g continuing in a direction along the center line L1 in such a way so as to become a communication path forming one portion of the center flow passage 8a between adjacent ribs 15g in a direction surrounding the center line L1 (see FIG. 13). Using tips of the three ribs 15g, the second columnar member 16b fits into the small diameter chamber 15b. An end face of the second columnar member 16b is positioned at a portion wherein the tip of the shaft portion 15j of the valve member 15h is positioned in the closing valve position.

One of the first columnar member 16a and the second columnar member 16b is the magnet, and the other is the ferromagnetic material.

Thereby, in the present embodiment, until the pressure in the pressure chamber 10 reaches the predetermined value by the forward movement of the piston 9, the valve member 15h is held by the holding device 16 in the closing valve position wherein the valve head portion 15i is closely attached to the valve seat 15c. Then, at the moment when the pressure in the pressure chamber 10 exceeds the predetermined value, the valve member 15h moves in the opening valve position so as to blow the air inside the pressure chamber 10 from the discharge portion 7 with a predetermined flow speed. Also, when the first blowing of the air is completed, the valve member 15h can move to the closing valve position immediately by an adsorption force of the magnet.

The fluid spraying device A according to the present embodiment has a structure wherein the load of the motor 12a when the piston 9 moves forward is minimized, and the flow speed of the air blowing out is effectively enhanced as mentioned above, so that the piston 9, the cylinder 11, and the motor 12a can be downsized as small as possible without any difficulty. Accordingly, the fluid spraying device A according to the present embodiment has characteristics providing the downsizing of the fluid spraying device A as a whole.

The fluid spraying device A according to the present embodiment is a unit having all functions for spraying air on the light entrance portion 1 of the vehicle camera C inside the casing, and by combining with the vehicle camera, a function of removing the water droplets, the dust, or the like attached to the light entrance portion 1 can be easily and reliably added relative to the vehicle camera C or the vehicle comprising the vehicle camera C.

Figure 14:
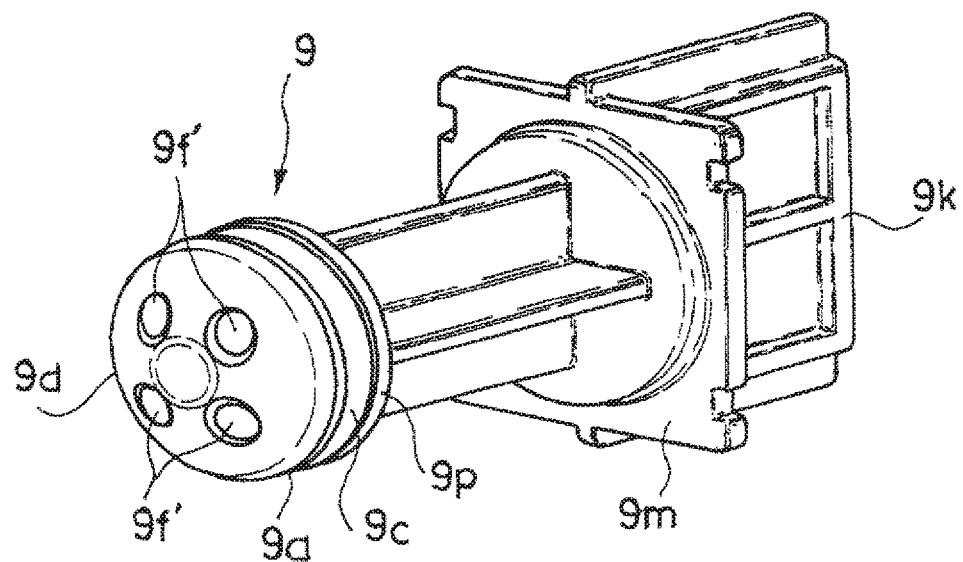
FIG. 14 is a perspective structural view of a piston of a second example wherein a structure of the piston forming the device for spraying the fluid shown in FIG. 1 to FIG. 13 is modified.
Figure 15:
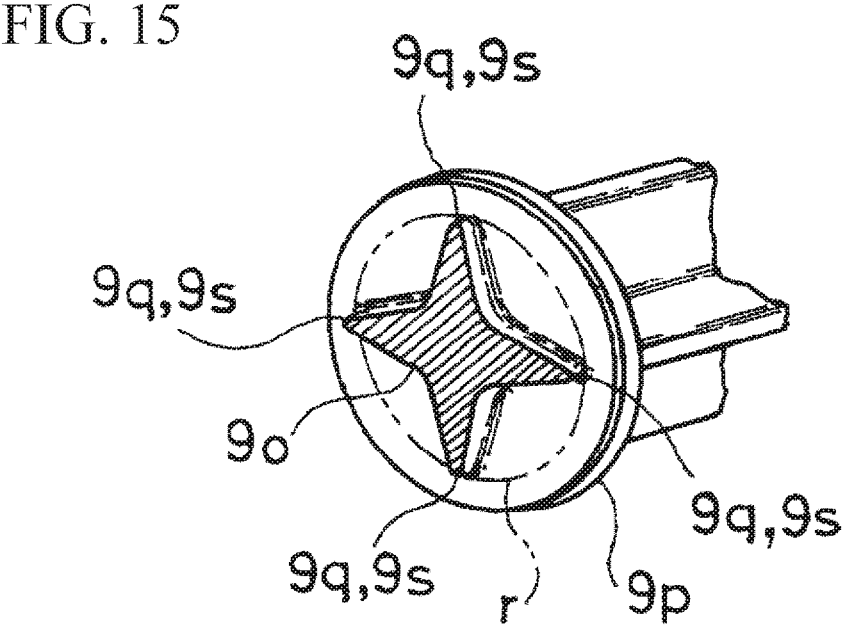
FIG. 15 is a cross-sectional perspective view of essential parts of the piston of the second example.
Figure 16:
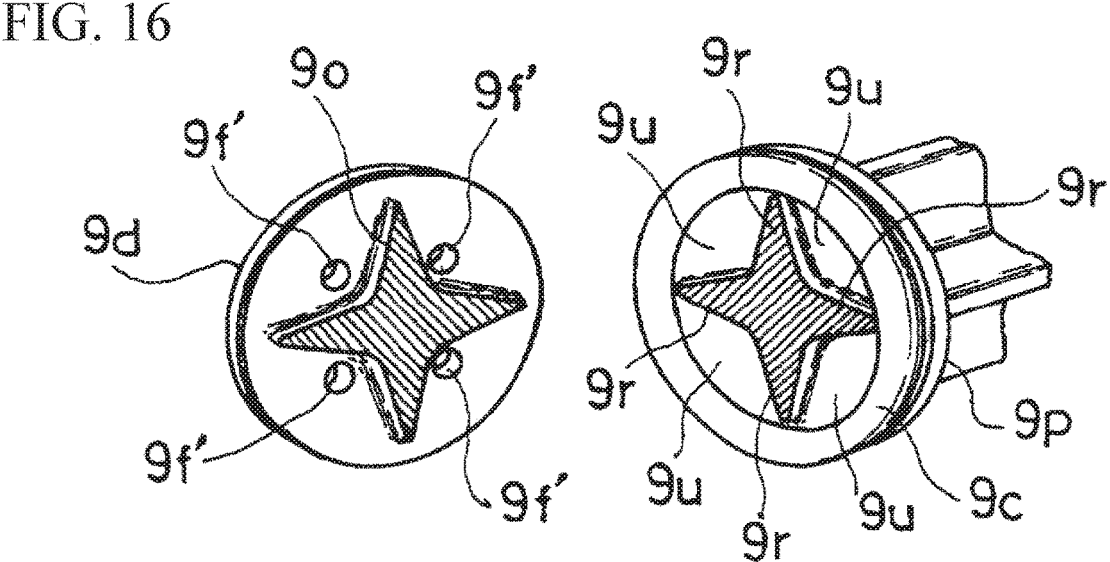
FIG. 16 is a disassembled perspective view of essential parts of the piston of the second example.

An example shown in FIG. 14 to FIG. 16 is a structural modified example (hereinafter, called a second example) of the piston in the example shown in FIG. 1 to FIG. 13. In the second example, four communication paths 9f' corresponding to the communication paths 9f in the example shown in FIG. 1 to FIG. 13 are provided at equal intervals between adjacent communication paths 9f' in the direction surrounding the center shaft of the piston 9. All of the respective communication paths 9f' are the through holes continuing in such a way so as to be parallel to the center line L1.

In the second example, the piston 9 comprises the front end portion 9d facing the pressure chamber 10; a neck portion 9o positioned behind the front end portion 9d; and a trunk portion 9p positioned behind the neck portion 9o. Then, using the neck portion 9o, the seal ring 9c is mounted on a side portion of the piston 9.

In the second example, the neck portion 9o connects the front end portion 9d with the trunk portion 9p, and comprises four support portions 9q of the seal ring 9c positioned on a circular arc of a virtual circle r having a diameter slightly smaller than an outer diameter of the front end portion 9d and the trunk portion 9p at intervals between adjacent support portions 9q in the direction surrounding the center shaft of the piston 9. The respective support portions 9q are formed by outer ends 9s of rib-shaped portions 9r protruding in a radial direction from a center of the neck portion 9o, and between adjacent support portions 9q, there is respectively formed a space 9u between the seal ring 9c and the center of the neck portion 9o. Four spaces 9u are formed, and each space 9u has the same width.

In the second example, the communication paths 9f' are formed in such a way so as to range between the front end portion 9d and the space 9u, and four spaces 9u respectively communicate with the pressure chamber 10 through the communication paths 9f'.

Thereby, in the second example, when the piston 9 moves forward (moves forth), a pressure in the space 9u on the inner side of the seal ring 9c is increased by the communication paths 9f' with small disparity at each position in a circumferential direction of the seal ring 9c, and the outer diameter of the seal ring 9c can be enlarged with the small disparity at each position in the circumferential direction of the seal ring 9c.

Figure 17:
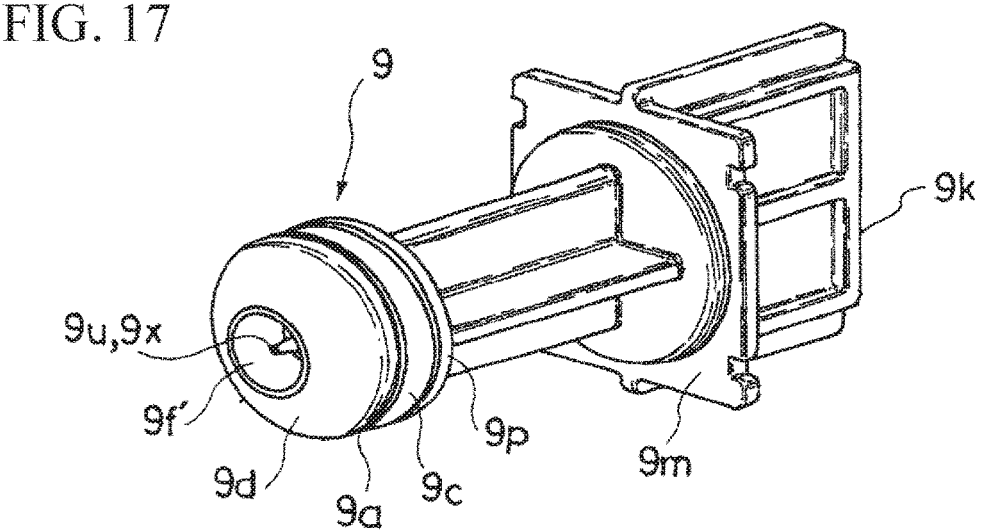
FIG. 17 is a perspective structural view of a piston of a third example wherein a structure of the piston forming the device for spraying the fluid shown in FIG. 1 to FIG. 13 is modified.
Figure 18:
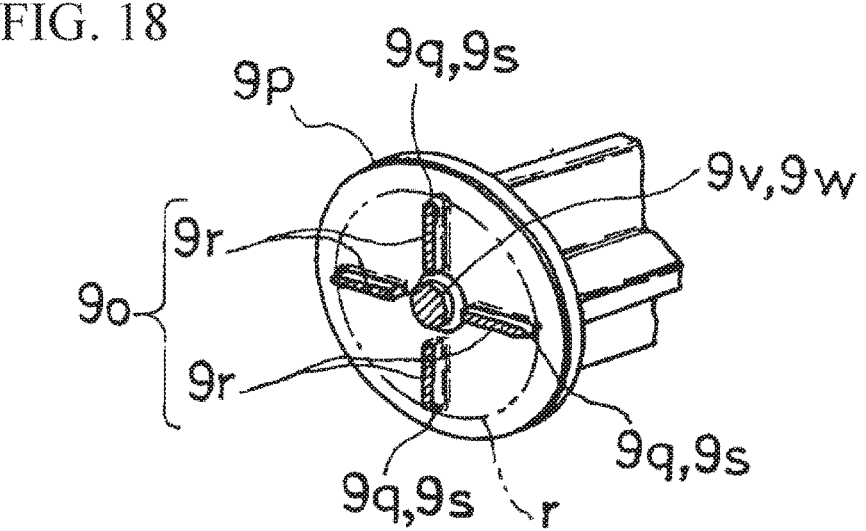
FIG. 18 is a cross-sectional perspective view of essential parts of the piston of the third example.
Figure 19:
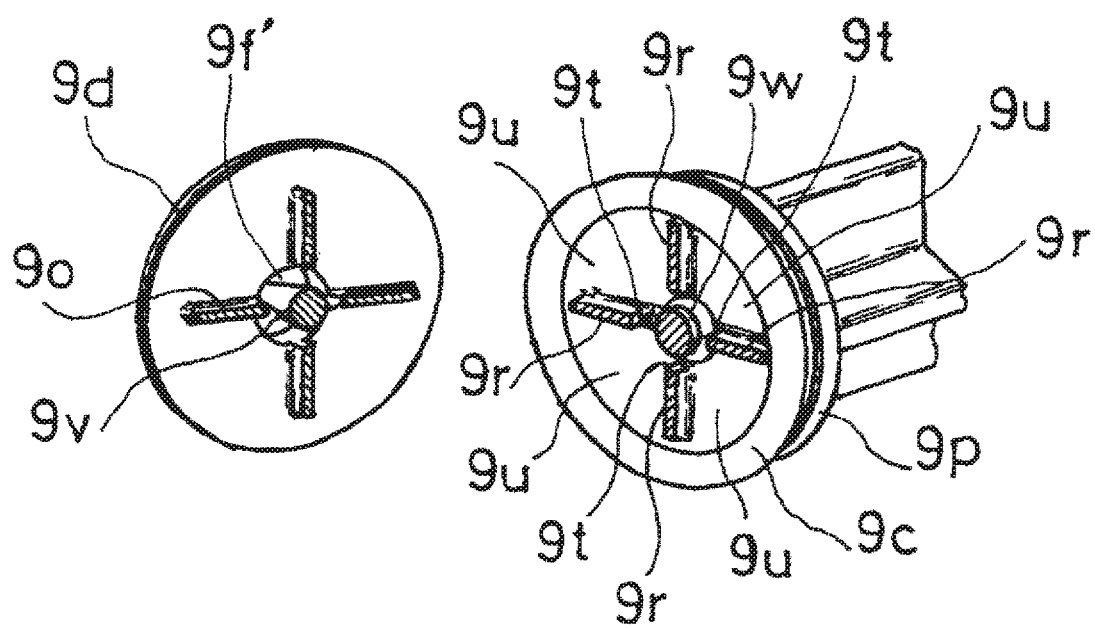
FIG. 19 is a disassembled perspective view of essential parts of the piston of the third example.

An example shown in FIG. 17 to FIG. 19 is a further modified example (hereinafter, called a third example) of the structure of the piston 9 in the example shown in FIG. 1 to FIG. 13. In the third example, the communication path 9f' corresponding to the communication path 9f in the first example is formed in a center shaft position of the piston 9.

In the third example, the piston 9 comprises the front end portion 9d facing the pressure chamber 10; the neck portion 9o positioned behind the front end portion 9d; and the trunk portion 9p positioned behind the neck portion 9o. Then, using the neck portion 9o, the seal ring 9c is mounted on the side portion of the piston 9.

In the third example, inside the communication path 9f, there is positioned a column portion 9v wherein an outer diameter is reduced more than a diameter of the communication path 9f. The column portion 9v is formed in such a way so as to integrate a base portion 9w with the trunk portion 9p and protrude to the pressure-chamber 10 side along the center shaft of the piston 9. The column portion 9v has a needle shape having a circular shape in a cross section and gradually narrowing the outer diameter as approaching a tip 9x, and between the column portion 9v and an inner face of the communication path 9f, there is formed an interval approximately equal at each position surrounding the center shaft of the piston 9.

In the third example, the neck portion 9o connects the front end portion 9d with the trunk portion 9p, and comprises four support portions 9q of the seal ring 9c positioned on the circular arc of the virtual circle r having the diameter slightly smaller than the outer diameter of the front end portion 9d and the trunk portion 9p at the intervals between the adjacent support portions 9q in the direction surrounding the center shaft of the piston 9. The respective support portions 9q are formed by the outer ends 9s of the rib-shaped portions 9r protruding in the radial direction from the column-portion 9v side. Between an inner end 9t of each rib-shaped portion 9r and the column portion 9v, there is formed a gap. Between adjacent rib-shaped portions 9r, respectively, there is formed the space 9u between the seal ring 9c and the column portion 9v. Four spaces 9u are formed, and each space 9u has the same width.

In the third example, by the communication paths 9f formed as mentioned above, the four spaces 9u respectively communicate with the pressure chamber 10.

Thereby, in the third example, when the piston 9 moves forward (moves forth), the pressure in the space 9u on the inner side of the seal ring 9c can be increased by the communication paths 9f with the small disparity at each position in the circumferential direction of the seal ring 9c, and the outer diameter of the seal ring 9c can be enlarged with the small disparity at each position in the circumferential direction of the seal ring.

Incidentally, obviously, the present invention is not limited to the embodiments explained in the above, and includes all embodiments which can obtain the object of the present invention.

EXPLANATION OF SYMBOLS

C a vehicle camera
1 a light entrance portion
6 a suction portion
7 a discharge portion
8 a flow passage
9 a piston
10 a pressure chamber
11 a cylinder
12 a drive mechanism
12a a motor
14 a first valve
15 a second valve
17 a casing Incidentally, all contents of the specifications, claims, drawings, and abstracts of Japanese Patent Applications No. 2017-008155 filed on Jan. 20, 2017, and No. 2017-182228 filed on Sep. 22, 2017 are cited in their entireties herein and are incorporated as a disclosure of the specification of the present invention.

What is claimed is:

1. A device for spraying a fluid on a vehicle camera, comprising:
   a suction portion for a fluid;
   a discharge portion for the fluid;
   a flow passage for connecting the suction portion with the discharge portion;
   a cylinder with a piston therein, having a pressure chamber in front of the piston and communicating with the flow passage;
   a drive mechanism for the piston including a motor;
   a first valve located between the suction portion and a communication portion between the pressure chamber and the flow passage, and functioning such that the first valve opens when the piston moves backward and closes when the piston moves forward;
   a second valve located between the communication portion between the pressure chamber and the flow passage, and the discharge portion, and functioning such that the second valve opens when a pressure in the pressure chamber reaches a predetermined value by a forward movement of the piston; and
   a casing for housing the suction portion, the discharge portion, the flow passage, the cylinder, the drive mechanism, the first valve, and the second valve configured to combine with the vehicle camera so that the fluid discharged from the discharge portion is configured to spray on a light entrance portion of the vehicle camera;
   wherein the second valve comprises:
   a body portion including a first diameter chamber positioned on a discharge-portion side and a second diameter chamber positioned on a pressure-chamber side, and having a communication portion with the second diameter chamber inside the first diameter chamber as a valve seat;
   a valve member positioning a valve head portion inside the first diameter chamber, and inserting a shaft portion extending from the valve head portion into the second diameter chamber; and
   a holding device holding the valve member in a closing valve position wherein the valve head portion is attached to the valve seat until a pressure in the pressure chamber reaches a predetermined value by a forward movement of the piston, and
   an outer diameter of the shaft portion of the valve member and a diameter of the second diameter chamber are substantially equal, and one line of groove along a length direction of the shaft portion is formed at a side portion of the shaft portion.

2. A device for spraying a fluid on a vehicle camera according to claim 1, wherein the drive mechanism for the piston includes an urging device for urging the piston in a backward-movement direction; and a rotation member including a cam portion against which a back end portion of the piston abuts by an urging force, and rotation-driven by the motor, and
   when the rotation member rotates, the piston moves forth and back by a shape of the cam portion.

3. A device for spraying a fluid on a vehicle camera according to claim 1, wherein a circumferential groove is formed on a side portion of the piston, and a seal ring is mounted using the circumferential groove, and a communication path is formed between a front end portion facing the pressure chamber of the piston and a portion positioned inside the seal ring in the circumferential groove.

4. A device for spraying a fluid on a vehicle camera according to claim 1, wherein the piston includes a front end portion facing the pressure chamber; a neck portion positioned behind the front end portion; and a trunk portion positioned behind the neck portion, and a seal ring is mounted on the piston using the neck portion, and a communication path is formed between the front end portion and a portion positioned inside the seal ring.

5. A device for spraying a fluid on a vehicle camera according to claim 3, wherein an inclined face is formed in a front end portion of the piston, and an entrance of the communication path is formed on the inclined face.

6. A device for spraying a fluid on a vehicle camera according to claim 1, wherein the holding device includes one of a magnet and a ferromagnetic material to which the magnet is adsorbed, on a valve-member side, and another of the magnet and the ferromagnetic material on a body-portion side.

7. A device for spraying a fluid on a vehicle camera according to claim 1, wherein the fluid is air.

* * * * *